United States Patent [19]

Blackie et al.

[11] Patent Number: 4,647,505
[45] Date of Patent: Mar. 3, 1987

[54] CELLULOSE FIBRES FOR CEMENT REINFORCEMENT

[75] Inventors: Merrick S. Blackie, West Haddon; David J. Poynton, Styvechale, both of United Kingdom

[73] Assignee: Courtaulds PLC, London, England

[21] Appl. No.: 665,162

[22] PCT Filed: Feb. 22, 1984

[86] PCT No.: PCT/GB84/00053
§ 371 Date: Oct. 16, 1984
§ 102(e) Date: Oct. 16, 1984

[87] PCT Pub. No.: WO84/03275
PCT Pub. Date: Aug. 30, 1984

[30] Foreign Application Priority Data

Feb. 23, 1983 [GB] United Kingdom ............... 8305045

[51] Int. Cl.$^4$ ..................... D02G 3/00; B32B 13/02; D21C 3/00
[52] U.S. Cl. ..................... 428/396; 162/70; 162/71; 162/72; 162/79; 162/158; 428/703
[58] Field of Search ............. 428/703, 403, 275, 396, 428/541, 357; 162/70, 71, 72, 79, 158, 159, 160, 161; 556/40, 54, 55

[56] References Cited

U.S. PATENT DOCUMENTS

| 3,243,447 | 3/1966 | Rinse ................................. 260/414 |
| 3,625,934 | 12/1971 | Rinse ................................. 260/97.5 |
| 4,423,112 | 12/1983 | Luthringshauser et al. ........ 428/541 |

FOREIGN PATENT DOCUMENTS

| 1134564 | 11/1982 | Canada ............................... 428/703 |
| 57388 | 8/1982 | European Pat. Off. . |
| 2409244 | 6/1979 | France . |
| 2448516 | 9/1980 | France . |
| 2009276 | 6/1979 | United Kingdom . |
| 2042607 | 9/1980 | United Kingdom . |

OTHER PUBLICATIONS

Chemical Abstracts, vol. 95, No. 12, 1981, p. 264, Abstract No. 102047Z, Coutta, Robert, "The Chemistry of Titanium Coupling Agents".
Composites, vol. 10, No. 4 (Oct. 1979), IPC Business Press Limited, Sussex G. B., pp. 228–232.

Primary Examiner—William J. Van Balen
Attorney, Agent, or Firm—Howson and Howson

[57] ABSTRACT

Cellulose fibres such as wood pulp are made more suitable for reinforcement of cement products by a treatment which reduces their swelling in aqueous and alkaline mediums. The fibres are dispersed in water, allowed to swell, and impregnated with a solution of a titanium and/or zirconium chelate compound. After drying, the fibres are heated to react the chelate compound(s) with the hydroxyl groups on the cellulose fibres, preferably to produce cross-linking between hydroxyl group residues.

The treated fibres are more stable in cement media, and, despite their increased hydrophobicity, are dispersible in cement slurries to give good web formation in the manufacture of cement products such as sheet. They impart improved flexural strength and modulus to cement products compared with untreated cellulose reinforcing fibres.

11 Claims, No Drawings

CELLULOSE FIBRES FOR CEMENT REINFORCEMENT

This invention relates to cellulose fibres suitable for cement reinforcement, and is concerned with a process for making cellulose fibres more suitable for that purpose and with fibre-reinforced cement products incorporating such fibres.

Substantial activity is being directed to developing reinforcing fibres for cement which replace the asbestos fibres formerly used. Cellulose fibres are being used for this purpose because of their capacity for dispersing in cement slurries to form webs in the manufacture of fibre-reinforced cement products. However, cellulose fibres are susceptible to swelling and degradation in the alkaline cement medium and this tends to reduce their performance as a reinforcement.

According to this invention, a process for making cellulose fibres more suitable for cement reinforcement is characterised by dispersing the fibres in an aqueous medium which swells the fibres, impregnating the swollen fibres with a titanium chelate compound and/or a zirconium chelate compound in solution, drying the fibres, and then effecting reaction between the chelate compound(s) and the hydroxyl groups on the cellulose fibres to link titanium and/or zirconium radicals to residues of said groups.

Preferably the aforesaid chelate compound(s) react with the hydroxyl groups on the cellulose fibres to form cross-links between residues of hydroxyl groups.

The cellulose fibres are preferably wood pulp fibrs, but other natural or regenerated cellulose fibres, for example viscose fibres, may also benefit from treatment by the process of the invention.

The invention includes cellulose fibres having an improved suitability for cement reinforcement after treatment by the process of the invention.

Cellulose fibres treated by the process of the invention have an enhanced stability against swelling, particularly if cross-linked as described. Moreover, the stabilising effect is apparent not just on the surface of the fibres but throughout the body of the fibres. This is the result of dispersing the fibres in an aqueous medium and allowing them to separate and to swell so that the chelate compound(s) can throughbly impregnate the fibres.

The chelate compound(s) may be added to the same aqueous medium used to disperse and swell the cellulose fibres and may be added at the same time as the fibres or later, after they have been dispersed. Preferably the chelate compound(s) are already in solution before being added to the aqueous dispersion medium.

The use of the chelated form of compound makes it possible to use an aqueous medium to disperse and swell the cellulose fibres and to act as a vehicle for impregnation because, unlike other titanates or zirconates, the chelated compounds resist hydrolysis by water at ambient temperatures. Thus, it is possible to control the conditions during impregnation and the subsequent drying step so that there is minimal hydrolysis of the chelate compound(s) by the water, and subsequently to treat the dried fibres to effect the desired reaction with the hydroxyl groups of the cellulose fibres when there is little or no water present to effect preferential hydrolysis.

Conditions which minimise hydrolysis during impregnation are the maintenance of the aqueous impregnation medium at ambient temperature and preferably at a low solution pH. If alkaline conditions are to be used to enhance the swelling of the cellulose fibres, then it is preferable to inhibit water hydrolysis of the chelate compound(s) by incorporation, for example, of a polyhydroxy compound such as sorbitol in the aqueous medium.

The aqueous medium may be mechanically extracted from the impregnated fibres, suitably to a solids concentration of 20 to 50, preferably 30 to 35, percent by weight, prior to final drying. The usual equipment for hydroextraction may be used including porous screens, squeeze rollers and rotary extractors. The hydroextracted fibres may be dried as a fixed or fluidised bed of fibres using a current of warm air as the drying medium. Hydrolysis of the impregnant chelate compound(s) by residual water is minimised during drying by keeping the temperature sufficiently low. Generally a temperature of about 40° C. to 60° C. is satisfactory, although with selected chelate compounds such as titanium dilactate higher drying temperatures can be used safely.

After the impregnated fibres have been dried, then the desired reaction between the chelate compound(s) and the hydroxyl groups on the cellulose fibres may be effected, conveniently by heating the fibres, preferably at a temperature of at least 100° C.

Titanium chelate compounds are the preferred compounds, and a number of suitable compounds are commercially available. These include those formed by reacting a titanate with the following chelating agents: alkanolamines (for example, triethanolamine and diethanolamine); $\beta$-diketones (for example, acetylacetone); keto esters (for example, ethylacetoacetate); hydroxy acids (for example, lactic acid) and certain glycols (for example, octylene glycol). The preferred titanium chelate compounds are titanium lactate, triethanolamine titanate and titanium acetylacetonate.

The concentration of the chelate compound(s) impregnated into the cellulose fibres does not need to be greater than 10 percent by weight based upon the dry weight of the cellulose fibres; indeed greater concentrations may have a deleterious effect by embrittling the fibres. A preferred range of concentration is 0.1 to 5 percent by weight based upon the dry weight of the cellulose fibres, and within this range the optimum concentration varies according to the reactivity of the particular chelate compound and the process conditions employed. The desired concentration of the impregnant may be obtained by appropriate settings of the impregnating solution concentration and of the solids concentration to which the impregnated fibres are hydroextracted before drying.

An aqueous medium is used to disperse and swell the cellulose fibres and, preferably, to impregnate them with the chelate compounds, and, as aqueous processes are invariably used in the processing of cellulose fibres, the process of the invention is readily accommodated into existing process and equipment schemes. Wood pulp is a basic and inexpensive source of cellulose fibres and its manufacture involves aqueous processing. The process of the present invention may be carried out in a pulp mill on wet pulp prior to the final drying and baling stages, with suitable modification and/or addition to the drying plant so that the treated pulp can be first dried under nonreactive conditions and then heated to effect reaction.

Cellulose fibres treated by the process of the invention have increased hydrophobicity but, possibly because the effect is not concentrated at the surface of the fibres, they remain wettable by water. This is important for even dispersion of the fibres in aqueous cement slurries so that uniform webs may be formed from the slurries for making fibre-reinforced cement products such as sheet and board.

The invention includes a fibre-reinforced cement product in which the reinforcing fibres comprise cellulose fibres which have titanium and/or zirconium radicals linked to residues of hydroxyl groups on the cellulose fibres, preferably with the titanium and/or zirconium radicals forming cross-links between said hydroxyl group residues. The cellulose reinforcing fibres suitably incorporate up to 1.0 percent by weight, preferably 0.01 to 0.5 percent by weight, of titanium or zirconium or titanium and zirconium together, based upon the dry weight of cellulose fibres.

The fibre-reinforced cement product may incorporate up to 10 percent by weight of the treated cellulose fibres based upon the dry weight of the product. It may also incorporate other reinforcing fibres, especially high modulus fibres, that is fibres having a modulus in excess of 10 G Pa, such as high modulus poly(vinyl alcohol) fibres and high modulus acrylic fibres. Usually the latter are incorporated in the cement product in lower concentration than the treated cellulose fibres.

The invention is illustrated by the following examples:

EXAMPLE 1

100 gms of compressed bleached Kraft pulp ("Lapponia" pulp) was defibrated with a mechanical blender in 4 liters of an aqueous solution containing 125 gms of a 50 percent by weight aqueous solution of titanium dilactate ["Tilcom" TL (Registered Trade Mark) produced by Titanium Intermediates Limited]. After steeping for 1 hour, the impregnated pulp fibres were separated from the liquor in a hydroextractor to a solids concentration of 26 percent by weight, and had a pick-up of titanium dilactate of 4.4 percent by weight based upon the dry weight of the pulp fibres.

The wet pulp was dried to a constant weight in air at a temperature of 105° C. over a period of 1 hour and then heating was continued at a temperature of 105° C. for 15 hours to effect reaction between the impregnated titanium dilactate and the hydroxyl groups on the cellulose of the pulp fibres.

The moisture regain of the treated pulp fibres at a temperature at 20° C. and a relative humidity of 90 percent was 12.0 percent by weight compared with 15.3 percent by weight for untreated pulp fibres.

The liability of the treated fibres to swell was assessed in water and normal (N/1) sodium hydroxide solution by steeping samples of the treated pulp fibres in such solutions at a temperature of 15° C. for 1 hour, and comparing the weight increases with those obtained for untreated pulp fibres given the same test. Weights were measured after identical 10 minute centrifuging of the steeped fibres to remove free liquid. The results were as follows:

| Sample | Weight Increase (percent) |
| --- | --- |
| Untreated pulp in water (Control) | 139 |
| Treated pulp in water (Example) | 78 |
| Untreated pulp in NaOH (Control) | 227 |
| Treated pulp in NaOH (Example) | 126 |

In order to test the performance of the treated fibres as a reinforcement for cement as compared with the untreated fibres, composite cement bars were made.

The fibres were dispersed in an aqueous slurry of Portland cement at a concentration of 6 percent by weight based upon the weight of the dry composite. The fibre-containing slurry was compressed into bar moulds and cured for a period of 14 days, at 100 percent relative humidity for the first 7 days and under ambient conditions thereafter. The bars were then tested for flexural strength and flexural modulus, both dry and wet, using the method of British Standard No. 4024-1981. The results are shown as follows:

| Sample | Flexural Strength M Pa | | Flexural Modulus G Pa | |
| --- | --- | --- | --- | --- |
| | Dry | Wet | Dry | Wet |
| Untreated Pulp (Control) | 14.4 | 10.4 (70.0) | 12.5 | 9.4 (75.2) |
| Treated Pulp (Example) | 16.5 | 12.3 (74.5) | 16.7 | 15.4 (92.2) |

The figures in brackets are the percentage retention of properties in the wet state compared with the dry and show a significant improvement for the treatment pulp, particularly with respect to flexural modulus.

EXAMPLE 2

The procedure of Example 1 was repeated but using 70 gms of zirconium acetylacetonate powder dissolved in a water/acetone mixture instead of titanium dilactate. The treated pulp fibres had a moisture regain at a temperature of 20° C. and 90 percent relative humidity, equal to 12.3 percent by weight compared with 15.3 percent for the unreated pulp fibres.

EXAMPLE 3

Staple fibres of regenerated cellulose made by the viscose process ("Fibro"—Registered Trade Mark) were dispersed in an aqueous solution of titanium dilactate ("Tilcom" TL). The solution concentration was adjusted to give an impregnation level of titanium dilactate after hydroextraction of 5 percent by weight based upon the dry weight of cellulose.

Another sample of the same fibres was similarly impregnated but at the 10 percent level.

Both fibre samples were dried in air at 60° C. and then heated for 1 hour at a temperature of 105° C. to effect reaction between the titanium dilactate and the hydroxyl groups on the regenerated cellulose fibres.

The treated fibres showed considerably reduced swelling in water and in normal (N/1) sodium hydroxide solution compared with untreated fibres when assessed as described in Example 1. The results were as follows:

| Sample | Weight Increase (percent) |
| --- | --- |
| Untreated fibres in water | 82.2 |
| Treated fibres in water (5% chelate) | 36.1 |
| Treated fibres in water (10% chelate) | 32.3 |
| Untreated fibres in NaOH | 159.2 |
| Treated fibres in NaOH (5% chelate) | 115.2 |
| Treated fibres in NaOH | 111.5 |

-continued

| Sample | Weight Increase (percent) |
|---|---|
| (10% chelate) | |

EXAMPLE 4

450 gms of compressed bleached Kraft pulp ("Lapponia" pulp) was defibrated with a mechanical blender in 15 liters of an aqueous solution containing 225 gms of an 80 percent by weight solution of triethanolamine titanate in isopropyl alcohol ("Tilcom" TET), 225 gms of a 65 percent by weight solution of ethoxy isopropoxy titanium bisacetoxyacetonate in isopropyl alcohol ("Tilcom" P1-2) and 225 gms of acetic acid.

The dispersed pulp was steeped for 1 hour in the solution and was then filtered off from the solution and squeezed to a solids content of 30 percent. The pick-up of the titanium chelate compounds was 7.1 percent by weight based upon the dry weight of the pulp fibres.

The wet pulp was dried to a constant weight in air at a temperature of 40° C. over a period of 16 hours. It was then heated in an oven at a temperature of 140° C. for 2 hours to effect reaction between the titanium chelate compounds and the hydroxyl groups on the cellulose of the pulp fibres.

A comparison was made between the performance of the treated pulp fibres and untreated pulp fibres as web formers in the production of cement composites reinforced by high modulus poly(vinyl alcohol) fibres.

Each sample of pulp was disc refined to a freeness of 40° Schopper Riegler and dispersed in an aqueous cement slurry. The solids content of the slurry comprised:

| | |
|---|---|
| Portland cement | 85.5 parts by weight |
| Bowl clay (Hymod AT) | 10.0 parts by weight |
| High Modulus PVA Fibre (Unitika HMI grade 10 mm staple) | 1.0 parts by weight |
| Refined pulp fibres | 3.5 parts by weight |

The slurry was formed into composite cement bars as in Example 1, and the wet flexural strengths and the dry densities of the bars were measured. The results were as follows:

| Sample | Wet Flexural Strength (M Pa) | Dry Density (kg/m³) |
|---|---|---|
| Untreated Pulp (Control) | 14.1 | 1,836 |
| Treated Pulp (Example) | 14.8 | 1,742 |

If allowance is made on a linear scale for the different densities of the bars, then the wet flexural strength of the bar incorporating the treated pulp is about 11.0 percent greater than that of the bar incorporating the untreated pulp.

EXAMPLE 5

"Lapponia" pulp was treated by the procedure of Example 1 but to a pick-up of titanium dilactate on the pulp of 2.2 percent by weight based upon the dry weight of the pulp fibres. The pulp was dried as before at a temperature of 105° C. over 1 hour and then split into five samples which were heated to effect reaction between the titanium dilactate and the hydroxyl groups on the cellulose of the pulp fibres at five different conditions.

Each treated sample of pulp was beaten in a "Lampen" mill for 40,000 revolutions and then made into a paper according to Standard T.A.P.P.I procedure T 200. The papers were produced purely as a method of testing the pulp fibre properties in relation to the treatment conditions and, as the results in the following Table show, there is no intention to demonstrate the suitability of the treated fibres for making paper. The tests used to measure the various properties of the papers are indicated in brackets.

TABLE

| Reaction Conditions | Freeness (SR°) (SCAN C19-65) | Breaking Length (TAPPI T220) | Porosity (TAPPI T460) | Capillary Rise (mm) (SCAN P13) |
|---|---|---|---|---|
| Untreated pulp (Control) | 55.5 | 12.94 | 660 | 12.5 |
| Treated pulp heated for : | | | | |
| 1 hour at 105° C. | 25.5 | 5.60 | 19 | 29.0 |
| 3 hours at 105° C. | 23.0 | 3.75 | 6 | 43.0 |
| 8 hours at 105° C. | 21.0 | 3.08 | 5 | 49.0 |
| 16 hours at 105° C. | 18.5 | 2.58 | 3.5 | 53.0 |
| 3 hours at 120° C. | 16.5 | 2.47 | 2.5 | 69.0 |

The reduction in pulp freeness, breaking strength and porosity in conjunction with the increased capillary rise, are consistent with an increasing extent of cross-linking as the reaction conditions are increased in severity.

EXAMPLE 6

300 gms of compressed bleached Kraft pulp (Lapponia pulp) were introduced into a mechanical blender together with 10 liters of an aqueous solution containing 150 gms of an 80 percent by weight solution of triethanolamine titanate in isopropyl alcohol ("Tilcom" T.E.T.), 150 gms of a 65 percent by weight solution of ethoxy isopropoxy titanium bisacetoxyacetonate in isopropyl alcohol ("Tilcom" P1-2), and 60 gms acetic acid.

The blender was operated so that the pulp was defibrated in the solution over a period of one hour. After this treatment, the pulp was filtered off from the solution and squeezed to remove excess liquid. The pick up of the titanium compounds was 4.3 percent by weight based on the dry weight of the cellulose.

The wet pulp was dried to a constant weight in air at a temperature of 40° C. over a period of 12 hours, and was then heated in an oven in air at a temperature of 140° C. for two hours to effect reaction between the titanium chelate compounds and the hydroxyl groups on the cellulose.

The resulting fibres had an increased hydrophobicity and a reduced swelling in water and in alkaline solutions, the extent of the reduction being greater in the latter case. The fibres remained sufficiently water wettable to be readily dispersible in aqueous media. In order to test their performance as a reinforcement for cement, they were beaten to a freeness level of 55° Schopper Riegler and then dispersed in an aqueous slurry of Portland cement in amount of 5 percent by weight based upon the dry weight of the cement plus fibre. The fibre-containing slurry was poured into bar moulds and allowed to set at room temperature in an atmosphere at 100 percent relative humidity over a period of three days. Each set bar had a water content of 15 percent by weight based upon the total weight of the bar. Drying of the bars was then effected in air at 80° C. over a further 24 hours.

The cement bars were tested for flexural strength and for flexural modulus, under both dry and wet conditions, using the method of British Standard No. 4624-1981. The results are shown as follows:

|  | Flexural Strength (M Pa) | Flexural Modulus (G Pa) |
| --- | --- | --- |
| Dry Test | 17.1 | 12.0 |
| Wet Test | 10.5 | 9.7 |

We claim:

1. A process for making cellulose fibres more suitable for cement reinforcement, characterised by dispersing the fibres in an aqueous medium which swells the fibres, impregnating the swollen fibres while dispersed in said aqueous medium with a titanium chelate compound and/or a zirconium chelate compound in aqueous solution under conditions which minimise hydrolysis of said chelate compound, mechanically extracting aqueous medium from said impregnated fibers to provide said fibers with a solids concentration of from about 20 to about 50 percent by weight, drying the hydroextracted fibers with a gaseous drying medium maintained at a temperature sufficiently low to minimise hydrolysis of the chelate compound by residual water in said fibers, and then effecting reaction between said chelate compound(s) and the hydroxyl groups on the cellulose fibres to form cross-links between residues of said hydroxyl groups on the surface and throughout the body of said fibres, the resulting cellulose reinforcing fibers having incorporated therein up to about 1%, by weight, of titanium, zirconium or mixtures thereof, based on the dry weight of cellulose fibres.

2. A process as claimed in claim 1, characterised in that the dried cellulose fibres incorporate up to 10 percent by weight of the chelate compound(s) based upon the dry weight of the cellulose fibres.

3. A process as claimed in claim 1, characterised in that the dried cellulose fibres incorporate 0.1 to 5 percent by weight of the chelate compound(s) based upon the dry weight of the cellulose fibres.

4. A process as claimed in claim 1, characterised in that the chelate compound is a titanium chelate compound formed by the reaction of a titanate and a chelating agent selected from the group comprising alkanolamines, diketones, keto esters, hydroxy acids and glycols.

5. A process as claimed in claim 4, characterised in that the titanium chelate compound is selected from the group comprising titanium lactate, triethanolamine titanate and titanium acetylacetonate.

6. A process as claimed in claim 1, characterised in that the dried fibres are heated to effect reaction between the chelate compound(s) and the hydroxyl groups on the cellulose fibres.

7. A process as claimed in claim 6, characterised in that the dried fibres are heated at a temperature of at least 100° C.

8. Cellulose fibres characterised by an improved suitability for cement reinforcement after treatment by a process as claimed in claim 1.

9. Cellulose fibres as claimed in claim 8 characterised in that the fibres comprise wood pulp fibres.

10. A cellulose fibre product produced by the process of claim 1,

11. A fibre-reinforced cement product in which the reinforcing fibres comprise cellulose fibres produced by the process of claim 1.

* * * * *